United States Patent

[11] 3,617,668

| [72] | Inventor | Thomas E. Lohr |
| | | Warren, Mich. |
| [21] | Appl. No. | 865,035 |
| [22] | Filed | Oct. 9, 1969 |
| [45] | Patented | Nov. 2, 1971 |
| [73] | Assignee | General Motors Corporation |
| | | Detroit, Mich. |

[54] SWITCH OPERATING MECHANISM
2 Claims, 6 Drawing Figs.

[52] U.S. Cl. .................................................. 200/152
[51] Int. Cl. ............................................... H01h 29/00
[50] Field of Search ...................................... 200/152.9, 152, 152.51

[56] References Cited
FOREIGN PATENTS

| 872,969 | 6/1942 | France | 200/152.51 |
| 966,661 | 10/1950 | France | 200/152.51 |

Primary Examiner—Robert K. Schaefer
Assistant Examiner—H. J. Hohauser
Attorneys—S. Carter and P. A. Taucher ABSTRACT: The invention relates generally to a switch-operating mechanism and, more particularly, to a switch-operating mechanism for controlling the up-down movement of automobile windows. The mechanism includes separate up-down pushbuttons in contact with separate mercury switches, with each of the pushbuttons having a cam arrangement that includes on-off position ramps to guide the mercury switches. Each pushbutton is spring biased to the off position to automatically return the mercury switch it contacts to the off position upon pushbutton release.

PATENTED NOV 2 1971

3,617,668

INVENTOR.
Thomas E. Lohr
BY
Peter A. Taucher
ATTORNEY

SWITCH OPERATING MECHANISM

This invention relates to a pushbutton switch mechanism and, more particularly, to a pushbutton switch mechanism wherein mercury switches are activated by a novel cam arrangement on the pushbuttons.

When the prior art U.S. Pat. Nos. 2,020,733, to Moehler, and 2,026,980, to Joy, show mercury-type switches, they do not teach or show the novel cam mechanism on pushbuttons in combination with mercury switches as disclosed and claimed herein.

The invention comprises a novel switch arrangement having an on-off-position ramp formed on a pushbutton and used for regulating or switching a circuit and, preferably, a circuit that controls the up-down movement of a window such as the electrically operated windows generally found in automobiles. The invention could be used for control of electric seats or the like. The switch has very few moving parts, and those parts which do move are made to cooperate with one another to provide smooth operation, eliminate breakage, and thereby assure long life.

Figure 1:
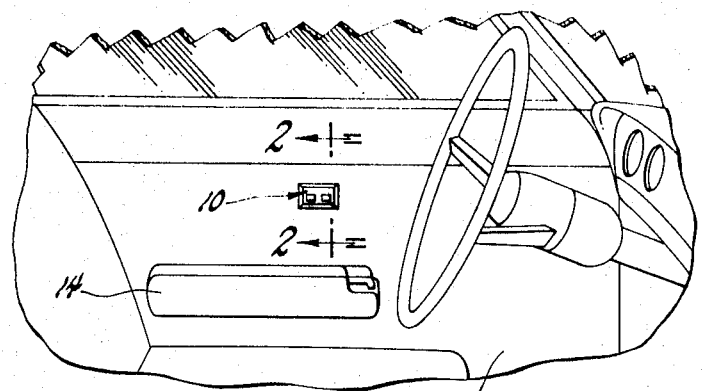
FIG. 1 shows a cutaway view of the interior of an automobile having the switch mounted in the door panel.
Figure 4:
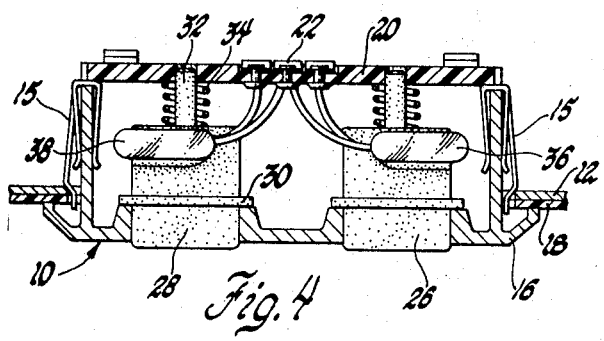
FIG. 4 is a sectional view taken along the line 4—4 of FIG. 2 showing the mercury switches cradled in the off ramps of the pushbuttons.

FIG. 1 shows the cutaway view of the interior of an automobile on the driver's side with the switch mechanism 10 mounted on the door panel 12 above the armrest 14. As best shown in FIG. 4, the mechanism is held in a locked position in the door by clips 15.

Figure 2:
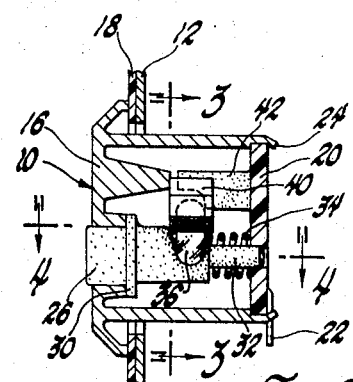
FIG. 2 is a sectional view taken along line 2—2 as shown in FIG. 1.

FIG. 2 is a cutaway section taken along the line 2—2 in FIG. 1 showing the switch mechanism 10 having housing 16 mounted within the door panel 12. As shown at 18, the door panel is covered with interior trim such as vinyl or the like. Switch base 20 having terminals 22 thereon is secured to the rear of the housing in any suitable manner as by turned-over portions or lips 24 formed on the housing. Extending outwardly of the switch housing are pushbuttons 26, 28 with one of the buttons acting as an up button, and the other button as a down button. The pushbuttons are held in position in the housing by shoulder 30 and pin-type member 32 positioned at the rear of the pushbutton, which member fits into a mating hole in the switch base and provides for a straight line movement of the pushbuttons. A spring 34 is mounted over the pin-type member 32 and serves to bias and automatically return the pushbutton to its original or nondepressed position.

Figure 3:
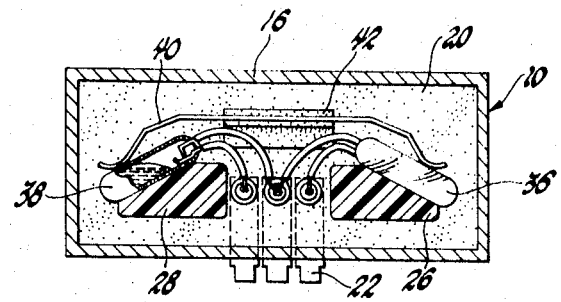
FIG. 3 is a sectional view taken along the line 3—3 as shown in FIG. 2 and depicting the switch in the off position.

As best shown in FIG. 3, there are two mercury switches 36, 38, with switch 36 acting as the down-position switch and switch 38 acting as the up-position switch. Mercury switch 36 is operated by pushbutton 26 and mercury switch 38 and is operated by pushbutton 28. A keeper spring 40 is attached to the switch base by means of an integrally formed keeper spring retainer 42. The purpose of the keeper spring 40 is to bias and maintain the mercury switches in engagement with the respective pushbuttons.

Figure 6:
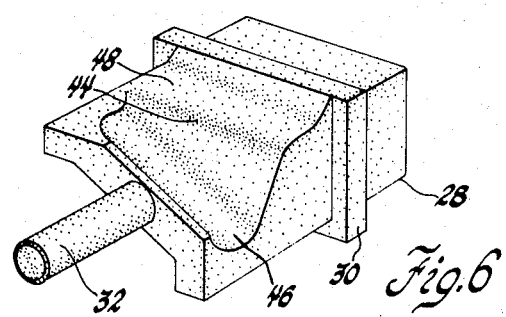
FIG. 6 is a view of the pushbutton only.

As best shown in FIG. 6, the pushbuttons have a cam surface formed thereon with the cam surface having an off-position ramp 46 and an on-position ramp 48. The cam surface is formed with a smooth transition surface 44 interconnecting the separate ramps 46, 48. It is readily seen that by inwardly moving the respective pushbutton, the mercury switch will move along the cam surface of the pushbutton from the off-position ramp to the on-position ramp in a very smooth transitional movement.

Figure 5:
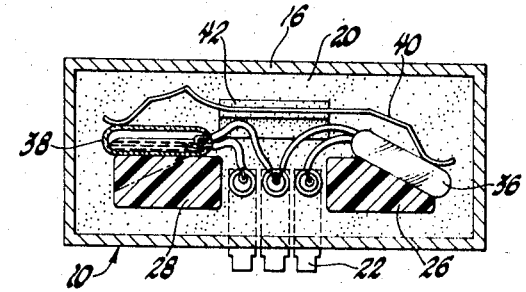
FIG. 5 is a view similar to that shown in FIG. 3 with one of the mercury switches cradled in the on-position ramp of the pushbutton.

In operation of the switch to energize the circuit to drive the window up, the pushbutton 28 is pressed inwardly against spring 34 to move mercury switch 38 from the off-position ramp surface upwardly against the keeper spring 40 along the cam surface of the pushbutton to the on-position ramp where the contacts in the mercury switch energize the necessary circuits to drive the window up. The position of the mercury switch during energization is best shown in FIG. 5. When the window is in the position desired, the pushbutton is released and upon release will return to its initial position in the switch housing by action of the return spring 34. The The mercury switch will, by action of keeper spring 42, return to the off-position ramp. The same operation would apply for the movement of the window downward by means of the pushbutton 26 and mercury switch 36.

As is apparent from the above description and drawing, the mechanism of the invention is simple in form, has very few moving parts, and is positive in operation, all resulting from a novel cam arrangement on the pushbuttons and keeper spring construction to actuate and positively hold the respective mercury switches.

I claim:

1. A switch mechanism comprising a housing, mercury switches attached at one end to a set of contacts within said housing and freely suspended in said housing at the other end, a separate spring-biased pushbutton in contact with each of said mercury switches at the freely suspended end, each pushbutton having a portion extending through said housing for manual actuation, said pushbutton also having a cam surface interconnecting separate circuit actuating position ramps formed thereon, a biased spring arm attached at one end within said housing and having a free end in contact with said mercury switches to bias said mercury switches against said ramps, whereby, as the pushbutton is actuated, said mercury switch in contact with one of said separate ramps is moved by actuation of said pushbutton from said ramp to another of said separate ramps along said cam surface to actuate a circuit.

2. A switch mechanism as set forth in claim 1, wherein said switch mechanism is adapted to be mounted in a vehicle to actuate circuit means within said vehicle, wherein the cam surface of said pushbutton is a smooth transitional surface connecting said circuit-actuating ramps.

* * * * *